United States Patent
Burwell

[15] 3,658,267
[45] Apr. 25, 1972

[54] APPARATUS FOR DISINTEGRATING TIRES AND THE LIKE

[72] Inventor: Stanley J. Burwell, Ravenhurst Circle, Glen Arm, Md. 21057

[22] Filed: Feb. 16, 1970

[21] Appl. No.: 11,594

[52] U.S. Cl. ..........................241/301, 51/105, 241/200, 241/279
[51] Int. Cl. ...........................................B02c 19/00
[58] Field of Search ............241/25, 30, 58, 82, 95, 101 R, 241/200, 277, 279, 280, 301, DIG. 31; 51/105 R, 106 R; 157/13

[56] References Cited

UNITED STATES PATENTS

| | | | |
|---|---|---|---|
| 3,491,493 | 1/1970 | Deist | 157/13 X |
| 2,205,939 | 6/1940 | Wilson | 51/105 |
| 2,786,636 | 3/1957 | Oishi | 241/DIG. 31 |
| 1,746,998 | 2/1930 | Gamel | 241/DIG. 31 |

Primary Examiner—Robert L. Spruill
Attorney—Lawrence J. Winter

[57] ABSTRACT

A tire grinding apparatus comprising means for storing a plurality of tires therein, means for feeding the tires one at a time to a rotating holding means, with means disposed adjacent said holding means for grinding and pulverizing a tire into a powdered form with vacuum means provided for collecting the powdered rubber from said apparatus, said grinding means having feed means for moving said grinding means into grinding engagement with a tire held by said holding means, and tire bead disposal means positioned adjacent said tire holding means for cutting the remaining tire bead in two and swing finger means adapted to throw said tire bead down chute means when the pulverizing and cutting operations are completed.

10 Claims, 4 Drawing Figures

PATENTED APR 25 1972

INVENTOR
STANLEY J. BURWELL

BY *Lawrence J. Urster*
ATTORNEY

PATENTED APR 25 1972 3,658,267
SHEET 2 OF 2
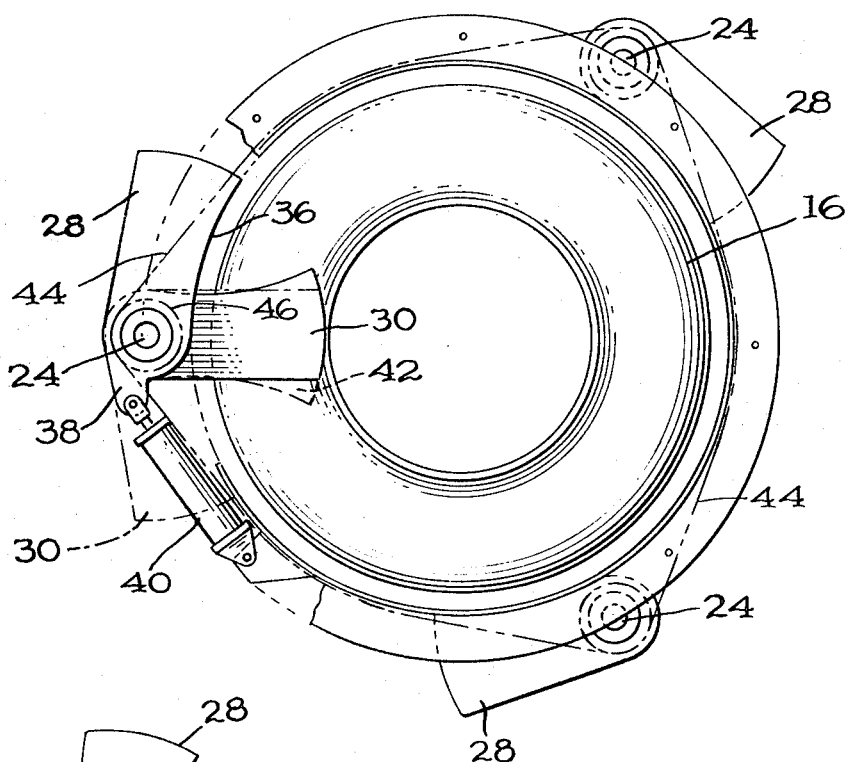
FIG. 2.
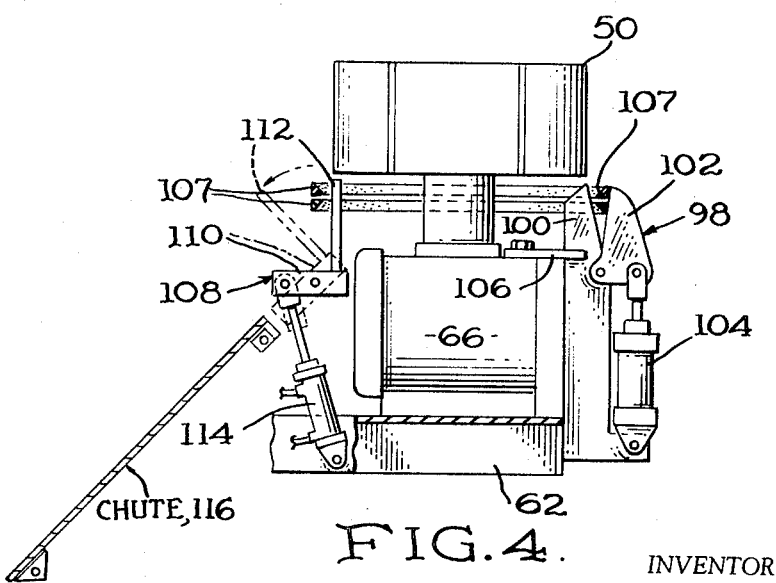
FIG. 3.
FIG. 4.
INVENTOR
STANLEY J. BURWELL
BY Lawrence J. Winter
ATTORNEY

APPARATUS FOR DISINTEGRATING TIRES AND THE LIKE

The present invention relates to an apparatus for disposing of whole tires that are no longer serviceable by reducing the used tire to a powdered form.

It is an object of the present invention to provide a tire disposal machine for disposing of used tires by reducing the tires to a rubber powder which can be used in molded rubber products or other industrial uses.

It is another object of the present invention to provide an efficient tire disposal machine which will grind a used tire into a powdered form and which will further cut the tire bead in two for ready disposal thereof.

Another object of the present invention is to provide a machine that can quickly reduce the discarded and used tire into a powdered form without causing pollution of the air, which occurred heretofore where tires were burned.

It is still a further object of the present invention to provide a tire disposal machine in which a plurality of stacked tires are fed one at a time to an expandable mandrel which holds the tire so that a grinding belt means may be fed into the tire and the fire quickly reduced to a pulverized or powdered form.

It is a further object of the present invention to provide a tire grinding machine in which the tires are fed one at a time through an escapement-type feed mechanism to the position at which the tire is held for the grinding means to reduce it to powdered form.

Various other objects and advantages of the present invention will be readily apparent from the following detailed description when considered in connection with the accompanying drawings forming a part thereof and in which FIG. 1 is a side elevational view of the invention, partly in section, and with certain parts of the machine left out for a clear illustration of the invention.

FIG. 2 is a detailed plan view of the escapement-type feed mechanism embodied in the tire disposal apparatus of the present invention.

FIG. 3 is a fragmentary detailed view of one of the escapement plates embodied in the feed mechanism, and FIG. 4 is a fragmentary detail view of part of the holding mechanism illustrated in FIG. 1, with the tire bead disposal system embodied in the invention shown in position with respect to the rotatable tire holding mandrel.

Figure 1:
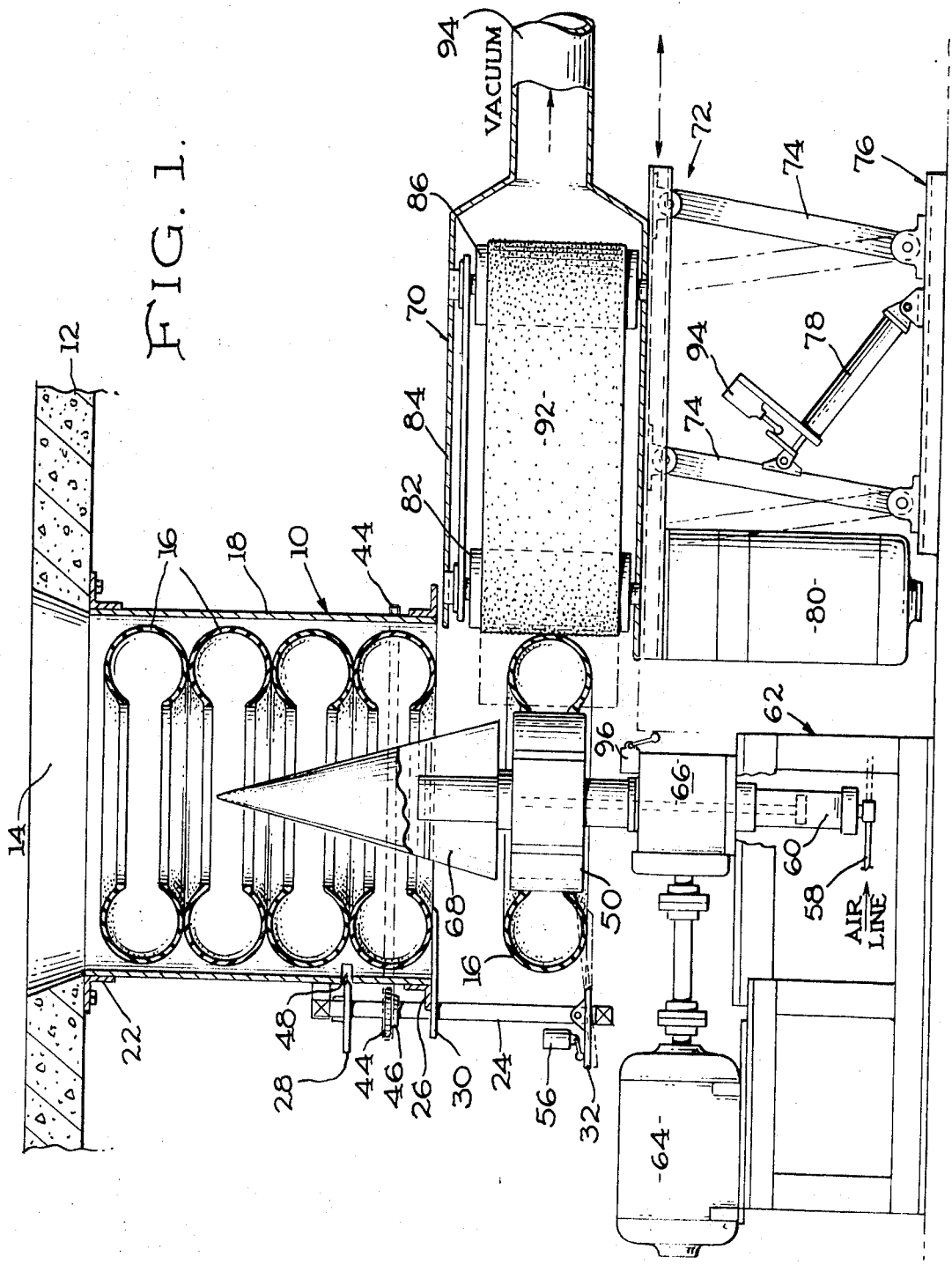

Referring to the drawings, the reference numeral 10 generally designates the tire disposal machine of the present invention which is shown in FIG. 1 positioned below an operating floor 12 having an opening 14 therein for receiving used or discarded automobile tires 16.

The machine is provided with a substantially cylindrical member or magazine 18 for storing the tires therein. The upper end of the magazine 18 is preferably secured to the floor 12 by an angle iron ring 22 secured to the cylindrical member by any suitable means, which ring in turn is bolted to the floor 12. The opposite ends of the magazine are open and a vertical shaft 24 is rotatably positioned adjacent the lower end of the magazine and secured thereto by an angle iron ring 26 which may be welded to the lower end of the magazine.

There are three identical shafts 24 disposed 120° apart from one another, as best seen in FIG. 2. The shafts support swingable plates fixed thereon consisting of upper plates 28 adjacent the upper end of the shaft, the middle plates 30 spaced approximately the width of one tire below the upper plates 28 and lower plates or bottom plates 32 disposed on the lower ends of the shafts 24. These shafts 24 are caused to rotate in unison by sprockets 46 fixed to the shafts and chain 44 which engages said sprockets.

Referring to FIG. 2, it will be seen that the plates are substantially rectangular in shape with an arcuate inner edge 36. One of the plates 28, as best seen in FIG. 2, is provided with an extension 38 on its rear end and has a hydraulic ram or cylinder 40 operatively connected thereto to swing the plate from the position shown in FIG. 2 where it is out of alignment with the tires in the magazine, or in a retracted position, to a position indicated at 42 in dotted lines in FIG. 2 wherein the plates are disposed at approximately 90° from their retracted position and are projected inwardly to interfere with the movement of the tires 16 in the magazine. The other two plates 28 are rotated or moved in unison with the plate 28 controlled by the hydraulic ram 40 by an endless chain and sprocket 46 secured to each shaft 24.

The plates 30 are disposed 90° out of phase with the plates 28, and the plates 28 and 30 can move into the magazine 18 through horizontally extending slots 48 disposed in the proper position in the magazine, as best seen in FIG. 1.

Plates 32 are disposed adjacent an inflatable expanding mandrel 50, which is an expanding mechanical segmental mandrel, actuated by a cone-shaped wedge pulled down by the piston rod of cylinder 60. Plates 30 and plates 32 are also activated by the same chain 44 carried by the sprockets 46 and the same ram 40.

The plates 30, as best seen in FIG. 1, are used to support the column or stack of tires 16, and a manual switch or any suitable means may be used to rotate or swing the plates 30 outwardly or retract them so that the bottom tire may fall down on the plate 32 when it is disposed inwardly.

When the plates 30 are retracted to permit the bottom tire to fall down on the plates 32, the plate 30 is in the position indicated in dotted lines in FIG. 2. At this time the plates 28 are moved into the cylinder or magazine 18 so as to support the remaining three tires 16 in the column of tires shown in FIG. 1. The lower tire 16 then falls down on the plates 32 and is disposed in horizontal or lateral alignment with the expandable mandrel 50. If desired, the plates 28 may be provided with stops 52, as shown in FIG. 3, and provided with limit switches 54 to activate the hydraulic source of supply for the hydraulic ram or cylinder 40 although any well known means may be used.

The lower plate 32 on the left hand side of the apparatus, as best seen in FIG. 1, may be a hinged plate so that the weight of the tire when it falls down on the plate 32 will close a limit switch 56 which can be operatively connected by any well known means to supply air under pressure through the air supply line 58 which communicates with a mandrel expanding cylinder or ram 60.

The cylinder 60 extends upwardly through a frame 62 to which it is secured and communicates with the interior of a well known and commercially available cylindrically expandable mandrel 50.

The mandrel, as best seen in FIG. 1, is adapted to expand so as to hold the tire 16 thereon. An electric motor 64 is also disposed on the frame 62 and is coupled to a gear reduction mechanism 66, also disposed on the frame. The gear reduction mechanism, in turn, is connected to the mandrel so as to rotate the mandrel at a suitable speed. The mandrel is further provided with a rotatable cone member 68 thereon for guiding a tire 16 from the magazine 18 after it has been released by the plates 30 onto the mandrel.

The machine 10 is provided with a plurality of cutting heads or mechanisms generally indicated at 70 in FIG. 1. For purposes of clarity only one mechanism is illustrated in the drawings although it is preferred to have a plurality of them, such as three cutting mechanisms equally spaced around the cylinder, preferably 120° apart. The cutter mechanism comprises a table or frame 72 having articulated legs 74 of a parallelogram type disposed on a base 76. A hydraulic ram cylinder 78 is operatively connected to the legs so as to move the cutter mechanism toward and away from the tire 16 to be ground, as indicated by the dotted lines in FIG. 1. The table 72 carries an electric motor 80 which drives a pulley 82 extending through the casing 84 of the cutter mechanism. An idler pulley 86 is disposed in the outer end of the casing 84. An endless grinding belt or sander 92 is disposed on the pulleys 82 and 86 for grinding the tire 16 on the mandrel 50. The casing 84 is connected through a discharge conduit 94 to a source of vacuum for removing the pulverized or powdered rubber to which the tire is reduced. The hydraulic rams 78 may be provided with a switch 94 connected to it for actuation thereof to move the cutter mechanism 70 inwardly when the tire 16 is properly secured to the mandrel and ready for grinding. A limit switch 96 may be provided if desired to retract the cutter mechanism 70 and collapse the mandrel when the tire has been properly pulverized.

Referring to FIG. 4, it will be seen that the frame 62 is provided with a tire bead cutter mechanism or disposal system 98 positioned adjacent the gear reduction mechanism, but out of the way of the plates 30 and the cutter mechanism 70 so that it in no way interferes with them. The bead disposal system is provided with a scissor or cutting member 98 comprising a stationary cutter blade 100 and a movable blade 102 actuated by the hydraulic cylinder 104. The fixed blade 100 is secured by a bracket 106 to the gear mechanism 66. The scissor member 98 is disposed to cut the remaining tire beads or rims of the pulverized tire after they have been released by collapsing the mandrel 50 and fall between the blades 100 and 102 of the scissors member. The bead disposal system is also provided with a swingable finger member 108 which comprises a horizontal frame 110 and a vertical finger or rod 112, with a hydraulic cylinder or ram 114 secured to the frame 62 for actuating the swingable finger member from the solid line position to the dotted line position shown in FIG. 4, to throw or cast the discarded tire beads 106 down a chute 116.

In operation, the tires are placed in the cylindrical member or magazine 18, as shown in FIG. 1, at which time the plates 30 are disposed in a position so that the lowermost tire in the magazine rests on the plates 30. Thereafter the plates 30 and 28 and 32 are actuated so that the plate 28 is moved into the cylinder 18 while the plates 30 are retracted or moved outwardly so that the lowermost tire can fall downwardly adjacent the collapsed mandrel 50. At this time, the plates 32 are positioned in their inwardly extended position so that the tire will be guided down the cone 68 and come to rest on the lowermost plates 32. A source of air under pressure is supplied through the line 58 causing the cylinder 60 to expand the mandrel 50, of well known construction, after which the plates 32 are moved outwardly. The mandrel will run continuously during the grinding operation.

Thereafter, the cutter heads or mechanisms 70 are actuated so as to move inwardly to grind the tire, and the powdered rubber is pulled out of the conduit 94. After the main carcass has been reduced until only the tire beads 106 remain, the source of air under pressure is decreased so that the mandrel collapses to the position shown in FIG. 4 and the beads will then fall down onto the scissors, at which time the cylinder 104 will be actuated to cut the tire bead and the cylinder 114 will throw the bead down into the chute.

From the foregoing description, it is apparent that the present invention may have various changes made in the arrangement and relative location of the several parts without departing from the spirit and scope of the invention, and it is not meant to limit the invention except by the following claims.

What is claimed is:

1. An apparatus for disintegrating tires and the like comprising a rotatable mandrel for holding a tire thereon, means for securing the tire to said mandrel, pulverizing means for disintergrating the tire secured to the mandrel, means for releasing the tire bead from the mandrel and tire bead disposal means for cutting the remaining tire bead when it is released from the mandrel.

2. The apparatus of claim 1 wherein tire feed means are provided for feeding a tire to said mandrel, including a feed magazine and swinging plate means of an escapement-type feed mechanism.

3. The apparatus of claim 2 wherein said swinging plate means includes substantially vertical shaft means with a first set of spaced horizontal plates disposed thereon, and a second set of spaced horizontal plates disposed on said shafts below first set of plates at least one tire width therebelow, and plate actuating means for swinging said second set of plates below a tire in said magazine at one time to support a tire thereon while simultaneously swinging said first set of plates to a retracted position outside of said magazine.

4. The apparatus of claim 3 wherein a third set of swingable plates is disposed on said shafts adjacent said mandrel to support a tire thereon until it is held by said mandrel.

5. The apparatus of claim 4 wherein said mandrel is of an expandable type.

6. The apparatus of claim 5 wherein rotatable guide means are provided on said mandrel for guiding a tire from said magazine onto said mandrel.

7. The apparatus of claim 6 wherein said pulverizing means include an endless belt sander disposed on rotatable pulley means.

8. The apparatus of claim 7 wherein articulated frame means are provided for said pulverizing means and actuating means are provided for said articulated frame means to feed said pulverizing means toward and away from a tire disposed on said mandrel.

9. The apparatus of claim 8 wherein said tire bead disposal means includes cutter means adjacent said mandrel for cutting the tire bead.

10. The apparatus of claim 9 wherein said disposal means includes a swingable rod means and chute means and actuating means for swinging said rod means to throw said cut tire bead down said chute.

* * * * *